July 6, 1926.

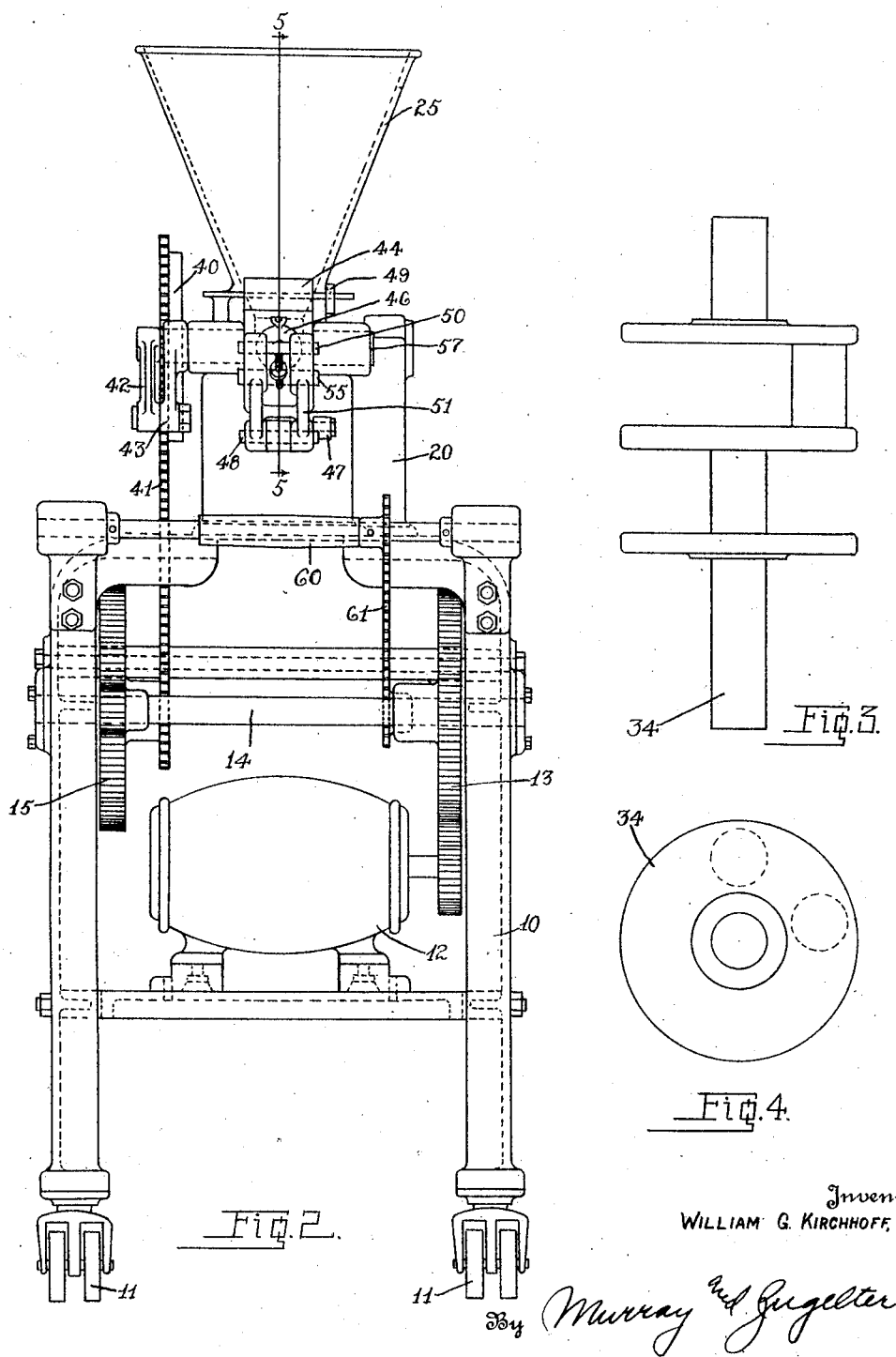

W. G. KIRCHHOFF

DOUGH DIVIDER

Filed April 2, 1924

Inventor
WILLIAM G. KIRCHHOFF

By Murray & Gugelter
Attorneys

Patented July 6, 1926.

1,591,492

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

DOUGH DIVIDER.

Application filed April 2, 1924. Serial No. 703,619.

My invention relates to dividers of the general class described in my co-pending application and is concerned with dividing plastics such as dough.

An object of my invention is to provide a device for the purpose stated that is exceedingly simple and that has a minimum of parts.

Another object of my invention is to provide a device that may be readily made in various sizes and that is especially adapted to be made of a size such that it may be employed for dividing dough into small units or loaves for producing buns or the like.

These and other objects are attained by the means described herein, and disclosed in the accompanying drawings, in which:—

Fig. 2 is an end elevation of the device shown in Fig. 1.

Fig. 3 is a detail view of a crank shaft forming a detail of my invention.

Fig. 4 is an end view of the crank shaft shown in Fig. 3.

Figure 5:
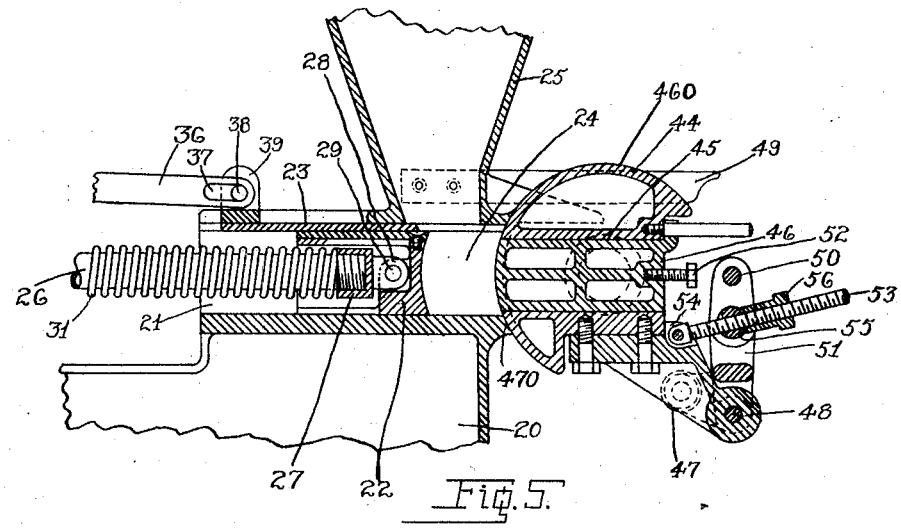
Fig. 5 is an enlarged sectional view on line 5—5 of Fig. 2.
Figure 6:
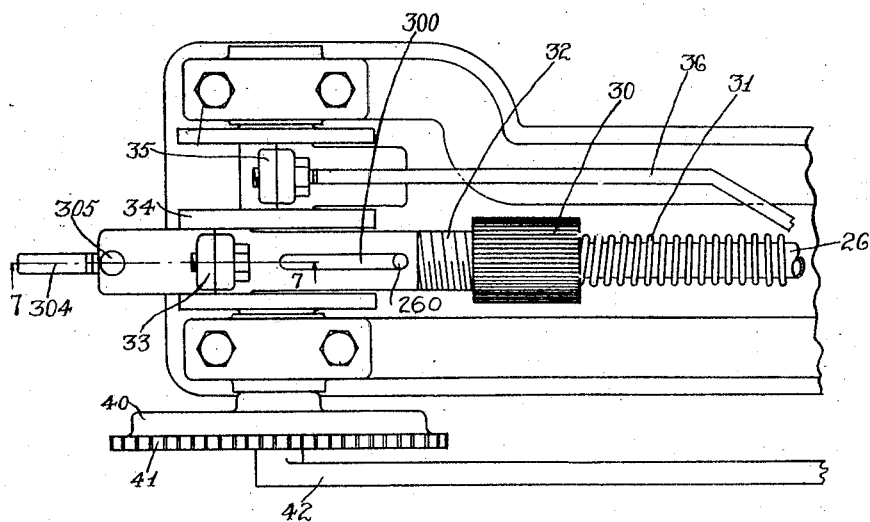
Fig. 6 is a fragmental plan view on line 6—6 of Fig. 1.
Figure 7:
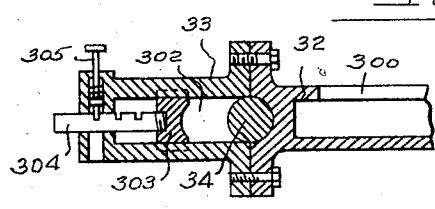
Fig. 7 is a fragmental sectional view on line 7—7 of Fig. 6.

The stand 10 is supported on suitable casters 11, whereby same may be readily moved from place to place. The stand supports a motor 12 that drives a gear 13, mounted on the shaft 14. The shaft 14 carries a suitable gear that drives the gear 15 mounted on the shaft 16. The stand 10 supports a casing 20. The casing has a way 21 formed through it and within said way is contained a reciprocating plunger 22. A reciprocating plate or cut off knife 23 is reciprocally supported by the casing 20, and is disposed above the plunger 22. The knife 23 is used to sever plastics contained within the chamber 24 formed at the forward end of the way 21, from a mass of plastic contained within the hopper 25. The plunger 22 is pivotally mounted upon the forward end of a plunger shaft 26. As shown herein, see Fig. 5, the forward end of the plunger shaft is capped, the cap 27 having forwardly extending lugs that are pivotally attached to lugs 28 carried by the plunger 22, by means of a suitable pin 29. The rear end of the plunger shaft is slidably and reciprocally received by a sleeve or nut 30 and a tube shaft 32. The nut is adjustable longitudinally of the tube shaft by means of co-operating threads thereon. The tube shaft has formed in it a longitudinally extending slot 300. A spiral spring 31 whose tension may be modified by adjustment of nut 30, extends about the plunger shaft 26 and has its opposite ends in abutment upon the sleeve 30 and the cap 27. This structure permits a yielding pressure of the plunger upon a plastic contained within the chamber 24. A pin 260 carried by shaft 26 extends through the slot 300. The pin limits the forward movement of the plunger shaft while the shaft 26 is under the influence of spring 31. The bearing or eccentric strap 33 is rotatably, reciprocally and eccentrically mounted upon the crank shaft 34 supported by the casing at the rear end of the casing. The bearing 33 has a longitudinally extending way 302 formed in it. The crank shaft extends thru this way. In this manner the plunger is given an intermittent motion in opposite directions. The length of the stroke of the plunger shaft may be modified by adjustment of a block 303 in the way 302, by any suitable means. As shown herein the means therefor comprises a notched pin 304 carried by the bearing, said pin limiting movement of the block 303 and the pin being held in adjusted positions by a spring actuated stop 305 that may lodge in the notches in the pin. The eccentric mounting of bearing 33 is utilized to give a generally reciprocating motion to the shafts 26 and 32 and consequently the plunger 22 is reciprocated. The crank shaft has a second eccentric bearing mounted thereon. This second eccentric bearing is indicated at 35 and carries a forwardly extending arm 36 provided at its forward end with an elongated slot 37 in which slot is received a pin 38 carried by brackets 39 extending upwardly from and carried by the reciprocating plate or cut off knife 23. The crank shaft 34 also carries a sprocket 40 that is driven from the shaft 16 by a suitable chain 41. A link 42 has a pivotal mounting on the sprocket 40 that extends forwardly of the device and has its forward end pivotally connected with a crank 43 associated with a drum 44, mounted on the casing for oscillation. The drum 44 has formed within it a way 45 within which is reciprocally contained a plunger 46. By reference to Fig. 5, it will be observed that when the plunger 46 is moved to the right, a pocket will be formed at the surface of the drum 44, such pocket communicating with the chamber 24. The operation of the parts is such that when the chamber 24 is filled with plastic, the knife 23 is moved toward the right, thereby severing the dough within the chamber 24 from the plastic within the hopper and thereby confining the plastic within the chamber 24. The plunger 22 is then moved toward the right and the pressure exerted upon the plastic causes the plastic to move the plunger in the drum toward the right thereby simultaneously creating and filling a pocket formed in the drum 44. Thereupon the drum 44 is moved in a counterclockwise direction, the engagement of the arcuate face 460 on the drum upon the arcuate shearing face 470 on the casing, serving to sever the plastic within the pocket from the plastic within the chamber 24. This will be readily evident by reference to Fig. 5. As the drum is moved in a counterclockwise direction, the drum is actuated for discharging the dough from the pocket. This is accomplished by the roller 47 carried by the shaft 48 associated with the drum 44, coming in contact with a stop rod or bar 49 carried by the drum. When the roller 47 engages the stop bar 49, the shaft 48 is rotatably actuated whereupon a pin 50 carried by the upper end of an arm 51 mounted on the shaft 48 moves the set screw 52 carried by the forward end of the plunger 46 together with the plunger 46 through the way 45 for expelling the charge of dough from the said pocket. At the time when the plunger is moved toward the right for depositing a charge within the said pocket, the set screw 52 and the pin 50 determine the limit to which the plunger 46 may be moved toward the right. Adjustment of the charge is made by means of a screw 53 having its rear end pivotally mounted on brackets 54 carried by the housing, said screw extending through a bore in a stud 55 carried by the arm 51. The screw carries an adjustment nut 56 that may engage the stud 55. It will be readily evident that if the nut 56 is adjusted forwardly of the screw 53, the arm 51 is free to move in a greater arc about the axis of the shaft 48 thereby increasing the stroke of the plunger 46, and vice versa. The crank 43 is carried by the shaft 57, said shaft 57 being co-axial with the drum 44.

Figure 1:
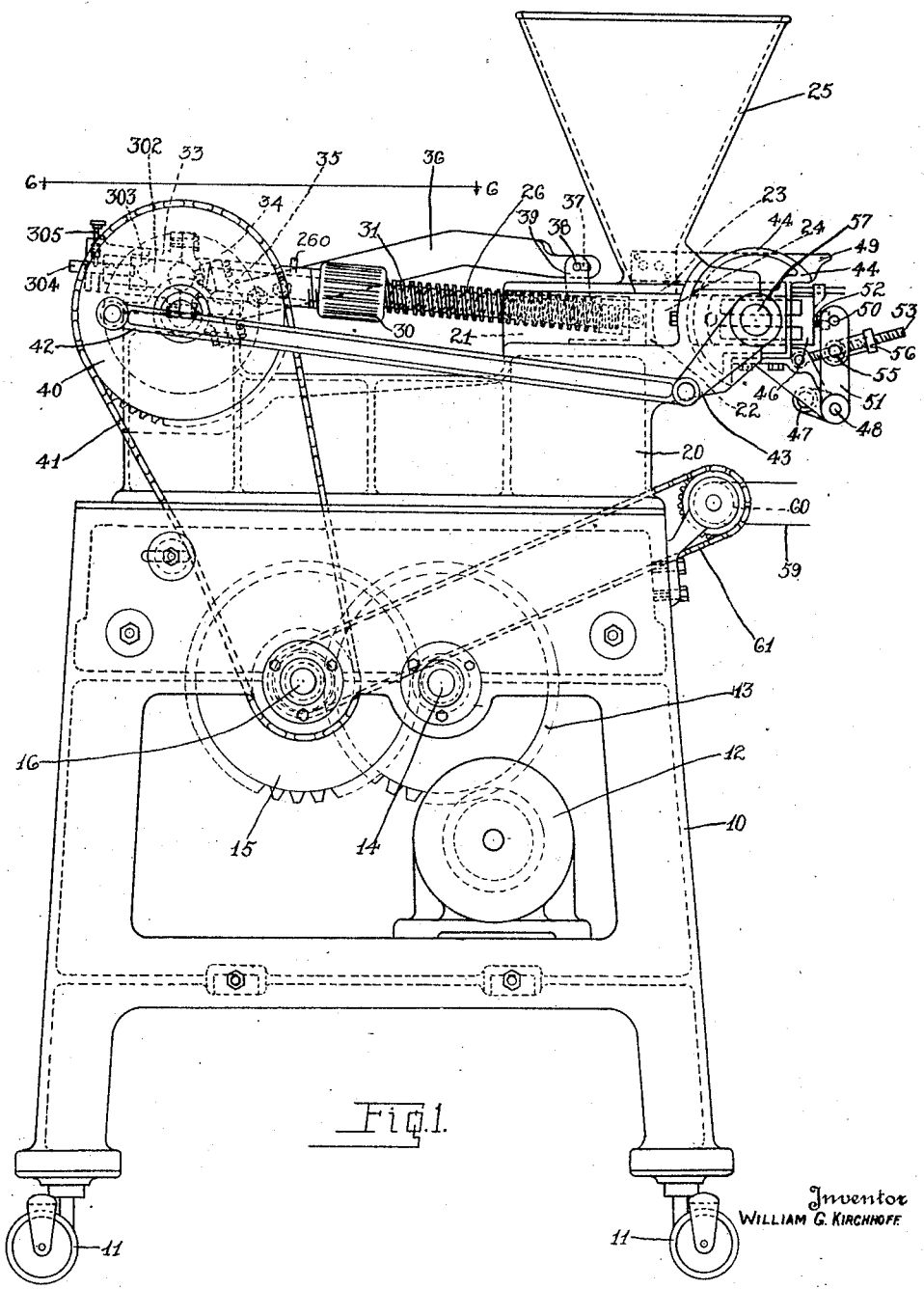
Fig. 1 is a side elevation of a device embodying my invention.

The various eccentric mountings upon the crank shaft 34 and upon the sprocket 40 bears such a relationship that the knife is first actuated for severing the plastic in the chamber 24 from the plastic in the hopper. The plunger 22 is then actuated for depositing a charge within the pocket formed in the drum. The drum is then actuated for severing the charge contained in the pocket from the mass of plastic contained in the chamber 24. The movement of the drum, after it severs the plastic in the pocket from the dough in the chamber, serves to discharge the plastic from the pocket. The pocket discharges downwardly onto a suitable belt 59 extending about a roller 60. The roller 60 may be driven by a suitable chain 61 from the shaft 16. It will be noted that the arm 36 associated with the cut off knife may complete a part of its rearward movement before the plate is drawn to the left. This is accomplished by the elongated slot 37. The parts bear such a relationship that the reciprocating knife or cut off plate is moved to the left a short period of time before the plunger 22 is moved toward the left, thereby a sucking action upon the plastic contained within the hopper is attained, this sucking action serving to fill the chamber 24 with plastic. The drum is returned to the position shown in Fig. 1, prior to the forward stroke of the plunger 22, whereupon the previously explained cycle is repeated.

Although the bearing 33 is shown with an elongated way 302, this feature may be eliminated and a substantially uninterrupted reciprocation of the plunger 22 be imparted to the plunger by rotatably mounting the bearing 33 on the crank shaft.

What I claim is:—

1. In a device of the class described the combination of a casing having a chamber therein, a plunger reciprocally contained within the chamber, a hopper adapted to communicate with the chamber, a reciprocating knife controlling communication between the hopper and the chamber, a drum mounted for oscillation and having a pocket adapted to register with the chamber in the casing, a plunger operating in the pocket, a revoluble shaft, a crank associated with the drum, a link having one end pivotally connected with the crank and having its other end eccentrically mounted upon the revoluble shaft whereby to impart an oscillating motion to the drum from the revoluble shaft, the oscillating motion of the drum serving to alternately place the pocket in and out of registration with the chamber in the casing, means associated with the drum, the casing and the plunger carried by the drum, for actuating said plunger for discharging the pocket when the pocket is out of registration with the chamber in the casing, the plunger in the drum being capable of movement in the pocket under the influence of the plunger in the chamber in the casing, a plunger shaft having bearings at its opposite ends upon the plunger within the chamber in the casing and upon an eccentric bearing associated with the revoluble shaft for intermittently moving the said plunger in the chamber, and an arm having its one end mounted upon the reciprocating knife and having its other end pivotally mounted upon an eccentric bearing associated with the revoluble shaft, and arranged for imparting an intermittent reciprocating motion to the knife.

2. In a device of the class described the combination of a revoluble shaft having three eccentric bearings thereon, a casing having a chamber therein, a hopper adapted to communicate with the chamber in the casing, a reciprocating knife controlling communication between the hopper and the chamber, a reciprocating plunger within the chamber, a plunger shaft having its forward end pivotally mounted upon the plunger, an eccentric strap having a pair of elongated apertures and having a bore therein for the reception of the plunger shaft, a pin carried by the rear end of the plunger shaft extending into one of the elongated apertures in the strap, one of the eccentric bearings of the revoluble shaft extending through the second elongated aperture in the strap, a collar adjustably mounted at the forward end of the strap, a spiral spring mounted upon the plunger shaft and having its opposite ends in abutment upon the collar and the plunger shaft, an arm having its rear end pivotally mounted upon a second eccentric bearing of the revoluble shaft, and having its forward end pivotally connected with the reciprocating knife, said pivotal connection being arranged to permit limited independent movement of the arm and the knife, a drum mounted on the casing for oscillation, a crank associated with the drum, a link having its forward end pivotally mounted upon the crank, and having its rear end pivotally mounted upon the third eccentric bearing associated with the revoluble shaft, the drum having a pocket formed within it, the revoluble shaft, link and crank being adapted to alternately bring the pocket in the drum into and from registration with the chamber in the casing, and means associated with the drum for discharging the pocket when the said pocket is out of registration with the chamber in the casing, and permitting charging of the pocket from the chamber when the pocket is in registration with the chamber.

3. In a device of the class described the combination of a casing having a chamber therein, a hopper communicating with the chamber, a knife controlling communication between the chamber and the hopper, a plunger within the chamber, a drum having a pocket therein, the pocket being adapted to register with the chamber, means for actuating the drum, a revoluble shaft, a plunger shaft having bearings at its opposite ends upon the plunger and upon an eccentric bearing associated with the revoluble shaft for intermittently moving said plunger in the chamber, and an arm having its one end mounted upon the knife and having its other end pivotally mounted upon an eccentric bearing associated with the revoluble shaft for imparting an intermittent reciprocating motion to the knife.

4. In a device of the class described the combination of a revoluble shaft, a casing having a chamber therein, a hopper adapted to communicate with the chamber, a knife controlling communication between the hopper and the chamber, a plunger in the chamber, a plunger shaft having its one end pivotally mounted upon the plunger, an eccentric strap mounted upon an eccentric bearing associated with the revoluble shaft and connected with the other end of the plunger shaft, a collar adjustably mounted on the forward end of the strap, a spiral spring mounted upon the plunger shaft and having its opposite ends in abutment upon the collar and the plunger, an arm having its rear end pivotally mounted upon an eccentric bearing associated with the revoluble shaft, and having its forward end pivotally connected with the knife for intermittently actuating said knife, and an oscillating drum having a pocket therein for alternate registration with the chamber and the atmosphere.

In testimony whereof, I have hereunto subscribed my name this 25th day of March, 1924.

WILLIAM G. KIRCHHOFF.